United States Patent
Anand et al.

(10) Patent No.: US 9,588,920 B1
(45) Date of Patent: Mar. 7, 2017

(54) METHOD AND SYSTEM FOR PORT TRUNKING

(71) Applicant: QLOGIC, Corporation, Aliso Viejo, CA (US)

(72) Inventors: Sanjaya Anand, Coto De Caza, CA (US); Kathy K. Caballero, Huntington Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 331 days.

(21) Appl. No.: 14/193,658

(22) Filed: Feb. 28, 2014

(51) Int. Cl.
*G06F 13/14* (2006.01)
*G06F 13/36* (2006.01)

(52) U.S. Cl.
CPC .............. *G06F 13/36* (2013.01); *G06F 13/14* (2013.01)

(58) Field of Classification Search
USPC ....... 710/29, 33, 60, 74, 105, 305, 306, 308, 710/313, 316
See application file for complete search history.

(56) References Cited

U.S. PATENT DOCUMENTS

| | | | |
|---|---|---|---|
| 5,838,681 A * | 11/1998 | Bonomi et al. | 370/395.41 |
| 7,908,404 B1 * | 3/2011 | Lok et al. | 710/5 |
| 8,095,978 B1 * | 1/2012 | Gandhi et al. | 726/20 |
| 8,155,022 B1 * | 4/2012 | Ainsworth | 370/252 |
| 8,250,252 B1 * | 8/2012 | Konda et al. | 710/22 |
| 2007/0025253 A1 * | 2/2007 | Enstone et al. | 370/235 |
| 2007/0266179 A1 * | 11/2007 | Chavan et al. | 709/250 |
| 2011/0173352 A1 * | 7/2011 | Sela et al. | 710/16 |
| 2012/0278514 A1 * | 11/2012 | Gupta | 710/48 |

OTHER PUBLICATIONS

Trunking, <https://en.wikipedia.org/wiki/Trunking>, accessed Mar. 17, 2016.*
Posted Write,<https://en.wikipedia.org/wiki/Posted_write>, accessed on Jul. 11, 2016.*

* cited by examiner

*Primary Examiner* — Khanh Dang
(74) *Attorney, Agent, or Firm* — Klein, O'Neill & Singh, LLP

(57) ABSTRACT

Methods and systems for sending and receiving information in a network are provided. The method includes configuring a port trunk as a PCI-Express function by an adapter, where the port trunk includes a plurality of network links that couple an adapter port to a port of another device; configuring the port of the other device for using the port trunk for sending and receiving information to and from the adapter port; transferring data by the adapter port on a same link for a write operation belonging to a same transaction for writing the data at a storage location; and receiving a confirmation for completing the write operation from the port of the other device after the data is written at the storage location, where the port of the other devices also uses a same link for sending information to the adapter port for the same transaction.

20 Claims, 5 Drawing Sheets

METHOD AND SYSTEM FOR PORT TRUNKING

TECHNICAL FIELD

The present invention relates to network communications.

BACKGROUND

Computing systems are commonly used today. A computing system often communicates with a peripheral device for performing certain functions, for example, reading and writing information. Network devices, for example, adapters and switches are commonly used for processing requests for reading and writing information at storage devices that are accessible via storage area networks. Continuous efforts are being made to improve network communications and processing of such requests.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
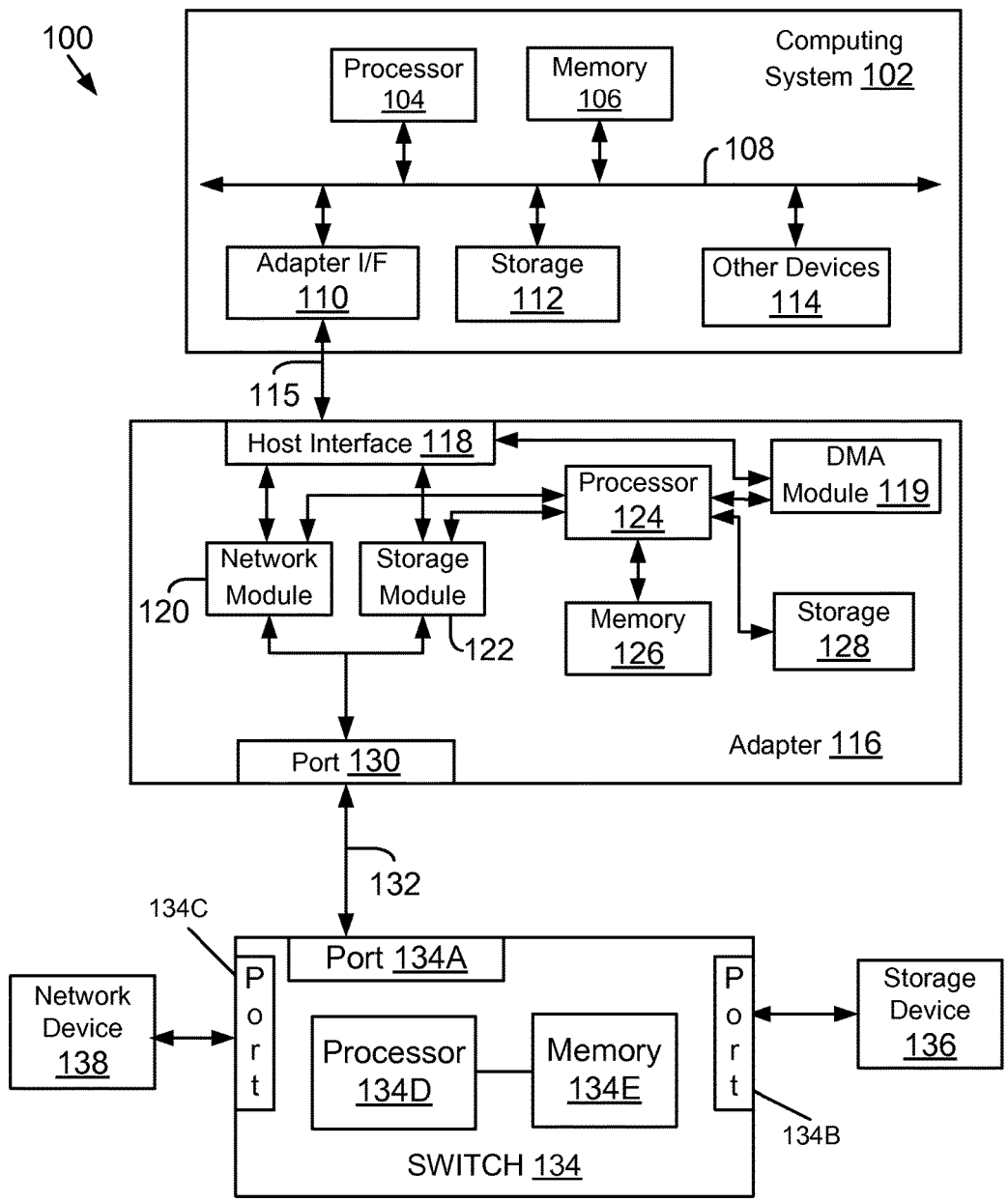
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System:

FIG. 1A is a block diagram of a system 100 configured for use with the present embodiments. The system 100 may include one or more computing system 102 (may also be referred to as "host system 102" or server 102) coupled to another device via a link 115, for example, an adapter 116 that interfaces with a network switch 134 that may be a part of a network (not shown). The network may include, for example, additional computing systems, servers, storage systems and other devices.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps (or instructions) out of a memory 106 that interfaces with an interconnect (may be referred to as a computer bus) 108. The interconnect 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 enables computing system 102 to interface with the adapter 116 via the link 115. Link 115 may be an interconnect system, for example, a PCIe bus. The embodiments disclosed herein are not limited to any particular bus type.

The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 interfaces to the computer bus 108 to provide the processor 104 with access to memory storage. Memory 106 may include random access main memory (RAM) or any other memory type. When executing stored computer-executable process steps from storage 112, processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple adapter 116 to computing system 102. Adapter 116 may be configured to handle network traffic, storage traffic or both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via host bus adapters (HBAs)) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed Ethernet networks (for example, Gigabit Ethernet networks or higher) while preserving the Fibre Channel protocol. Adapter 116 shown in FIG. 1A may be configured to operate as an FCOE adapter and may be referred to as FCOE adapter 116. The illustrated adapter 116, however, does not limit the scope of the present embodiments. The present embodiments may be practiced with adapters having different configurations.

Referring back to FIG. 1A, adapter 116 interfaces with computing system 102 via link 115 and a host interface 118. In one embodiment, host interface 118 may be a PCI Express interface having logic/circuitry for sending and receiving PCI-Express packets.

Adapter 116 may also include a processor 124 that executes firmware instructions out of a memory 126 to control overall adapter operations. Adapter 116 may also include storage 128, which may be for example non-volatile memory, such as flash memory, or any other device. Storage 128 may be used to store executable instructions and operating parameters that can be used for controlling adapter operations.

In one embodiment, adapter 116 includes a network module 120 for handling network traffic via a network link 132. In one embodiment, network module 120 includes logic and circuitry for handling network packets, for example, Ethernet or any other type of network packets. Network module 120 may include memory buffers (not shown) to temporarily store information received from other network devices 138 and transmitted to other network devices 138.

In one embodiment, adapter 116 may also include a storage module 122 for handling storage traffic to and from storage devices 136. Storage module 112 may further include memory buffers (not shown) to temporarily store information received from storage devices 136 and transmitted by adapter 116 to storage devices 136. In one embodiment, storage module 122 is configured to process storage traffic according to the Fibre Channel storage protocol, or any other protocol. It is noteworthy that adapter 116 may only have a network module 120 or storage module 122. The embodiments described herein are not limited to any particular adapter type.

In one embodiment, adapter 116 also includes a direct memory access (DMA) module 119 that is used to manage access to link 115 for transferring data to and from the computing system 102. The DMA module 119 uses a plurality of DMA channels (not shown) for managing access to link 115. The DMA channels are typically used to move control structures such as input/output control blocks (IOCBs), input/output status blocks (IOSBs) and data between host system memory 106 and the adapter memory 126.

Adapter 116 also includes a port (or interface) 130 that interfaces with port 134A of a switch 134, via the network link 132. Port 130 includes logic and circuitry to receive information via the network link 132 and pass it to either the network module 120 or the storage module 122, depending on the packet type.

In one embodiment, switch 134 includes a plurality of ports, for example, 134A-134C. The embodiments disclosed herein are not limited to any particular number of ports. As mentioned above, port 134A is coupled to port 130, while port 134B is coupled to storage device 136 (or a controller (not shown) of storage device 136. Port 134C is coupled to another network device 138 that may be a computing system or any other device.

In one embodiment, switch 134 also includes a processor 134D and a memory 134E. Processor 134D executes instructions (or firmware code) out of memory 134E for controlling the overall operations of switch 134 including port trunking, according to one embodiment.

Figure 1B:
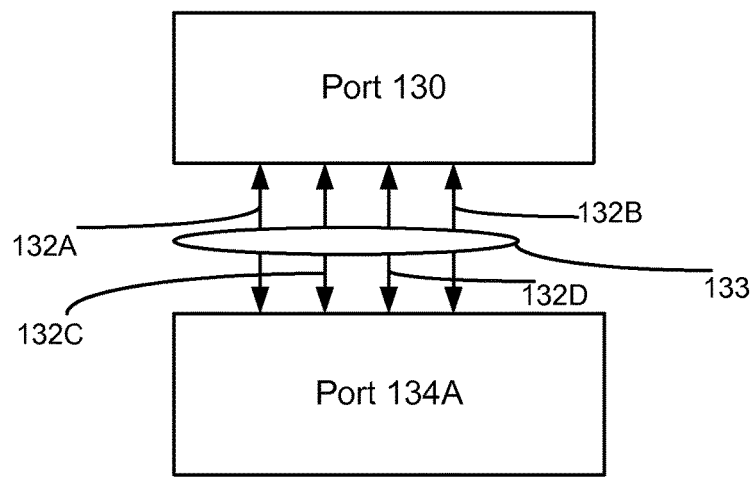
FIG. 1B shows an example of using a port trunk, according to one embodiment.

FIG. 1B shows an example of port trunking between port 130 and port 134A, according to one embodiment. Ports 130 and 134A may be coupled using a plurality of network links 132A-132C (similar to network link 132 described above with respect to FIG. 1A). Each link may operate at the same or different rates. The term rate as used herein mean a rate at which a link is able to transfer information, for example, 1G, 10G or higher. The links may be a part of a logical group 133 (may be referred to as a port trunk) that is associated with a PCI-Express function. A PCI-Express function is used to describe hardware by providing a function number, a configuration address space and base address registers.

In conventional systems, special hardware is used by adapters to implement the port trunking concept, for example, in Fibre Channel based networks. This adds cost and complexity to the entire process. By associating the port trunk 133 to a PCI-Express function, adapter 116 is able to use more than one link for sending and receiving information without having to use dedicated hardware.

The embodiments described herein manage the port trunk 133 as a PCI-Express function. Adapter 116 manages the trunk from an "Exchange" (or Sequence) perspective. In Fibre Channel, frames (or data) are transferred as part of a Sequence. Each frame that is transferred or received has a sequence number (for maintaining order and reliability). When using trunk 133, adapter 116 that manages I/O requests, selects one of the links 132A-132C for sending frames. Once the link is selected, adapter 116 uses the same link to send frames for the same Sequence. This allows the adapter 116 to track the order of frames that are being transmitted.

When switch 134 has to send frames to port 130, then switch 134 also selects one of the links for sending frames. Switch 134 then uses the same link for a same Sequence to send frames. It is noteworthy that port 130 and switch port 134A may use different for transmitting frames, for example, port 130 may use link 132A to send frames for Sequence A and port 134A may transmit frames via link 132C for Sequence A.

Figure 1C:
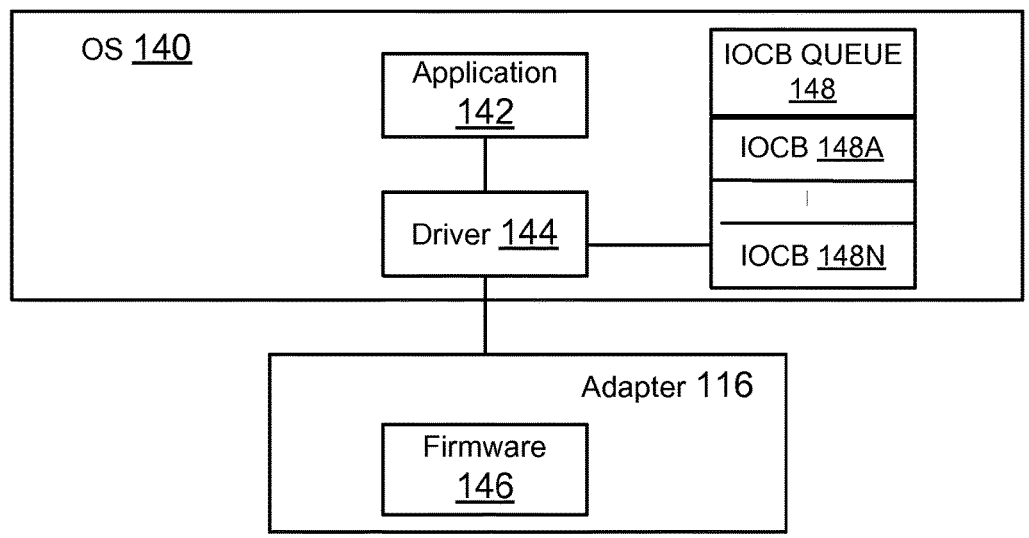
FIG. 1C shows a block diagram of a generic architecture used by the system of FIG. 1A.

The process of using port trunk 133 is described below with respect to FIGS. 2-4. Before describing the process flows, the following describes the generic overall software architecture used by system 100 with respect to FIG. 1C.

Processor 104 executes an operating system 140 for controlling the overall operations of host system 102. The operating system 140 may be Windows® based, Linux operating system, Solaris® (without derogation of any trademark rights), or any other operating system type. The embodiments disclosed herein are not limited to any particular operating system type.

In one embodiment, processor 104 also executes an application 142 for performing certain functions. For example, application 142 may be an email program, a database application or any other application type. Application 142 may send a command to a driver 144 for performing an operation, for example, reading and/or writing data (input/output (I/O) at a storage device. The driver 144 processes the request and communicates with firmware 146 of adapter 116 executed by processor 124. A component of adapter 116 then processes the I/O request.

Figure 2:
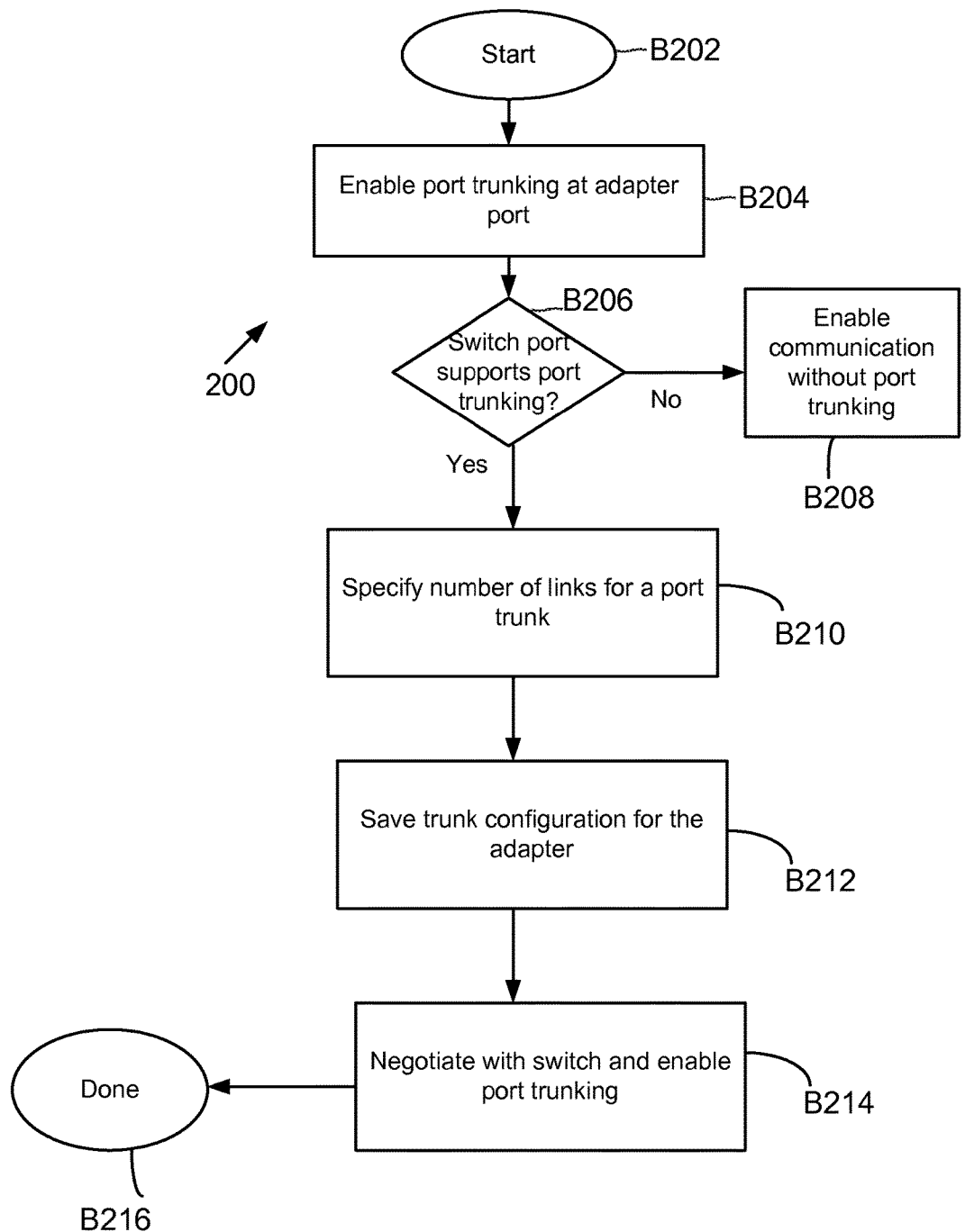
FIGS. 2-4 show various process flow diagrams for configuring and using port trunking, according to one embodiment.

Typically for data transfers across link 115 and link 132, an IOCB is generated by the driver 144 and saved at an IOCB queue 148, shown as 148A-148N. The IOCB queue 148 may be at host memory 106 or any other location. The IOCB is obtained by adapter 116 via a DMA operation which may be to provide data to host processor 104 or to send data provided by host processor 104. Based on the IOCB, adapter 116 executes the operations that may be needed. Adapter 116 then uses DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process Process Flow:

FIG. 2 shows a process 200 for configuring port trunk 133, according to one embodiment. The process steps may be executed by a management application (not shown) executed at a computing system (for example, similar to computing system 102).

The process begins in block B202, when host system 102 and the adapter 116 are initialized. In block B204, port trunking is enabled at port 130. The port trunking may be enabled by setting a configuration parameter at storage 128 (or any other location). The configuration parameter is accessible to firmware 146.

In block B206, adapter 116 determines if switch port 134A can support port trunking. This may be determined by sending a message to switch port 134A and then expecting a certain response. Switch processor 134D (or hardware logic at the port itself) responds to the message based on how the switch is configured. If port trunking is not enabled at switch port 134A, then in block B208, port 130 and 134A communicate without port trunking.

If port trunking is supported by switch 134, then a number of links for the port trunk 133 are specified in block B210. The port trunk configuration information identifying ports 130 and 134A and the links within the port trunk are saved. The configuration information can be stored at storage 128 and/or memory 126.

In block B214, the adapter port 130 negotiates with switch port 134A to enable port trunking. The negotiation process may be based on the parameters defined by the protocol used by the switch and the adapter. For example, when Fibre Channel is used as the protocol, then negotiation is based on Fibre Channel standards. Thereafter, the process is completed in block B216.

Figure 3:
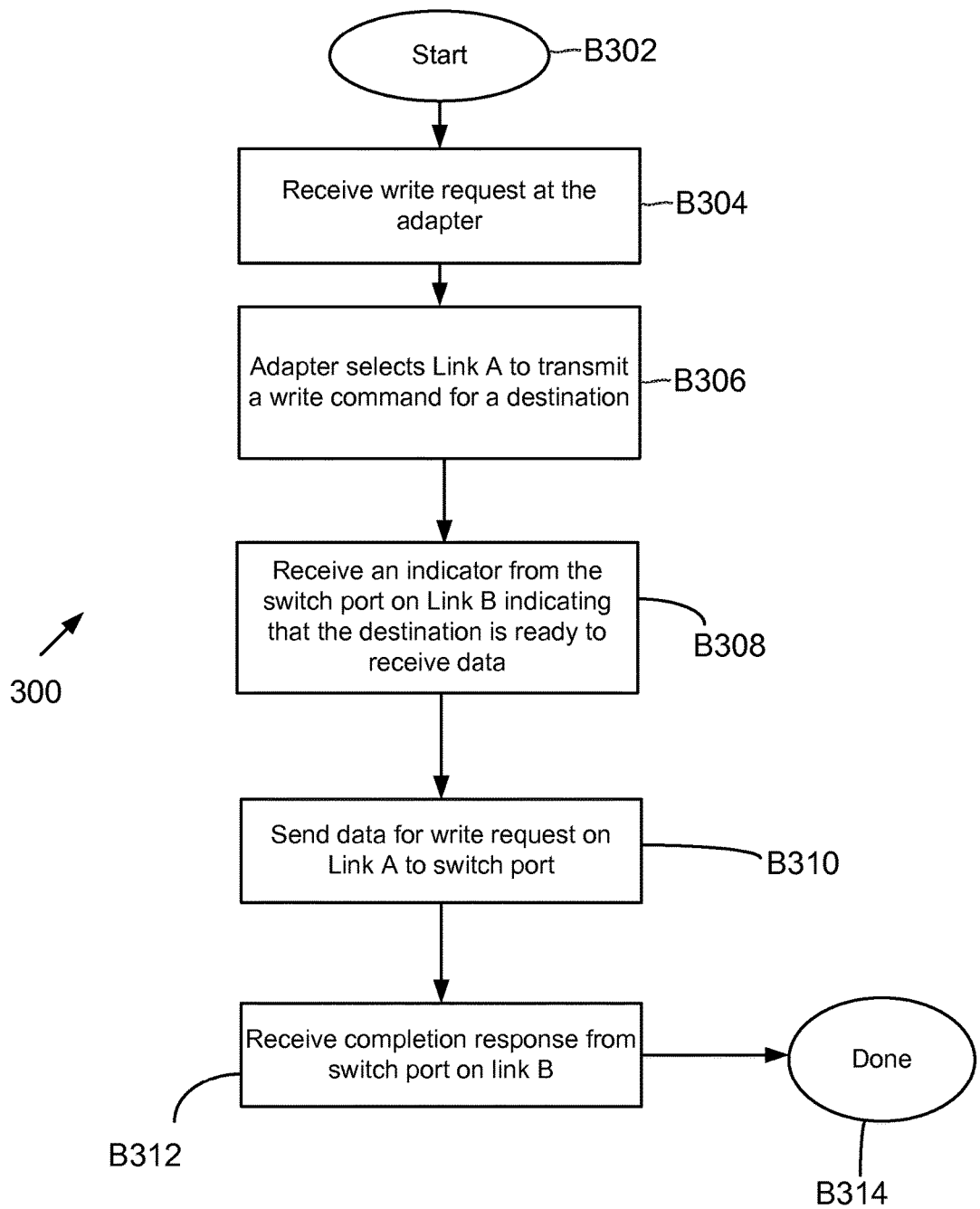

FIG. 3 shows a process 300 for managing write requests using port trunk 133, according to one embodiment. The process begins in block B302, when application 142 is initialized and operational. Adapter port 130 and switch port 134A are also operational using port trunk 133. Application 142 initiates a write request to write information at a storage location for example, 136. The write request may be placed as an IOCB at IOCB queue 148. Adapter 116 is notified of the IOCB.

In block B304, the IOCB is retrieved by adapter 116 via a DMA operation. In block B306, adapter 116 prepares a write command and selects one of the links (for example, 132A) from among a plurality of links of the port trunk 133. The write request is part of an Exchange (or Sequence) that is uniquely identified. Adapter 116 maintains a data structure for tracking information regarding the Sequence i.e. frames that are sent out by adapter 116 and any response that may have been received for the Sequence. The data structure is used to also identify the link that is used to send the write command. This enables the adapter 116 to send information for the same Sequence using the same link.

In block B308, the port 130 may require an indicator (or a message) from the switch port 134A that the destination is ready to receive data. Switch port 134A selects a link from among the plurality of links to send the indicator, for example, link 132B. An example of such a message is XFER_RDY command based on the SCSI standard. The embodiments disclosed herein are not limited to any particular message format. The adapter 116 updates the Sequence data structure to indicate the link it received the message from. This again allows the adapter 116 to maintain in-order delivery using the port trunk.

In block B310, adapter 116 may send the write data for the Sequence using the same link it used for sending the write command. Once the data is written, port 130 receives a completion status (or response) from switch port 134A. The completion may be received via link 132B on which the XFER_Rdy was received in block B308. Thereafter, the process ends in block B314.

Figure 4:
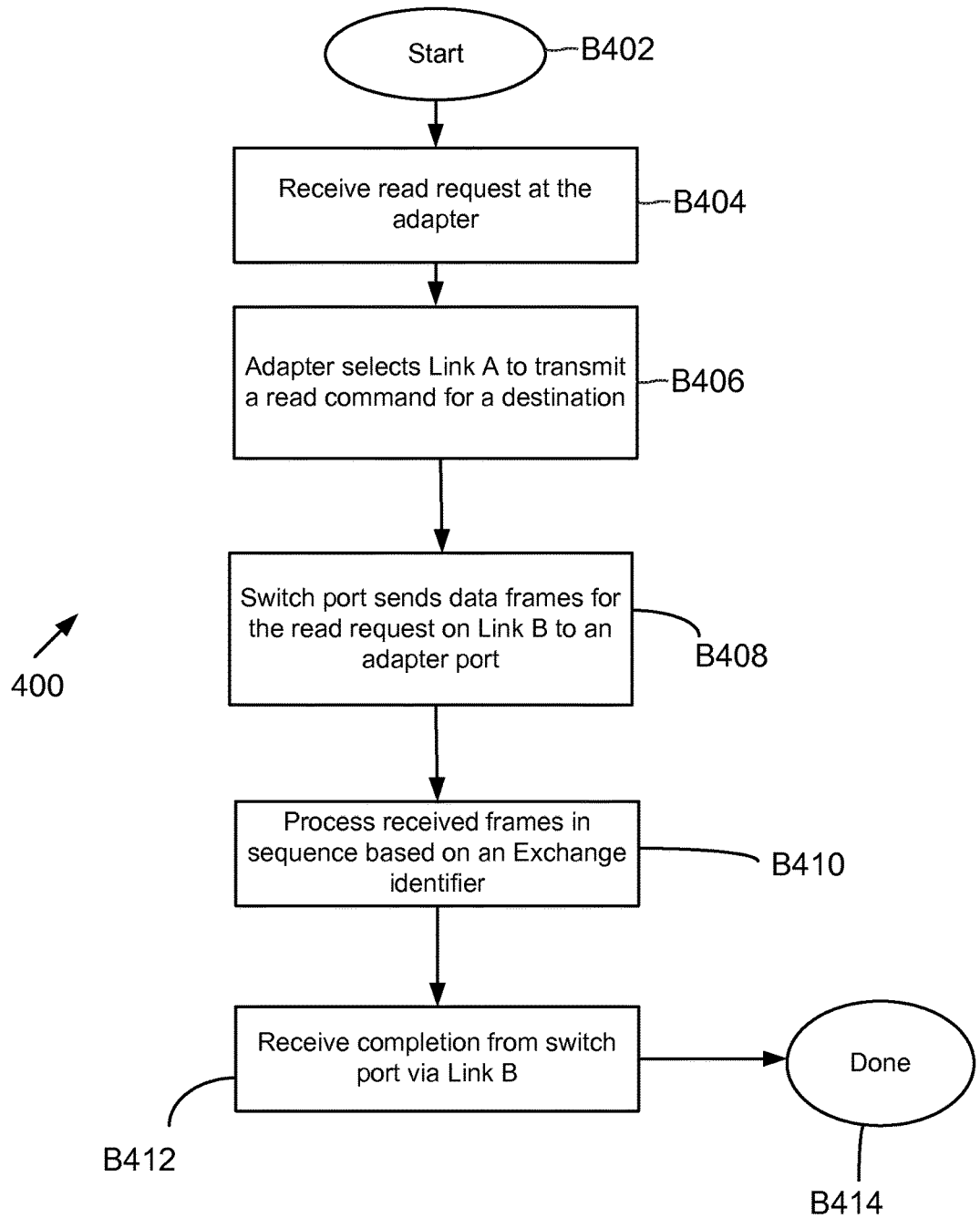

FIG. 4 shows a process 400 for managing read requests, according to one embodiment. The process begins in block B402. The process begins in block B402, when application 142 is initialized and operational. Adapter port 130 and switch port 134A are also operational using port trunk 133. Application 142 initiates a read request to read information from a storage location for example, 136. The read request may be placed as an IOCB at IOCB queue 148 and adapter 116 is notified of the IOCB.

In block B404, adapter 116 retrieves the read request from host memory, for example, by a DMA operation. In block B406, the adapter 116 selects a link from among the plurality of links of port trunk 133 to send a read command to switch 134. As an example, adapter 116 may select link 132A.

In block B408, switch 134 receives the requested data and retrieves the data from storage 136. Switch 134 then selects a link to send the data frames, for example, 132B. Switch port 134A then uses the same link to send data frames for the same Exchange to port 130. The switch port 134A may use an Exchange identifier to send the frames using the same link.

After all the data frames are sent, in block B412, the switch port 134A sends a completion to port 130. Adapter 116 receives the frames and processes the frames such that they can be delivered in order to application 142. The process then ends in block B414.

In one embodiment, as described above, no special hardware is needed or used to implement port trunking, while maintaining reliable, in-order delivery of frames. If one of the links goes down, then the remaining links can still be used for sending and receiving data. If a link goes down in the middle of a Sequence, then the Sequence may be retried on another link.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method, comprising:

configuring a port trunk as a PCI-Express function managed by an adapter interfacing with a computing device via a PCI-Express link using direct memory access (DMA) operations, where the port trunk includes a plurality of network links that couple an adapter port to a port of another device via the plurality of network links for sending and receiving information using a network protocol;

enabling the configured port trunk for the adapter by setting a parameter at a storage location at the adapter;

transmitting a message by the adapter port using the network protocol to the port of the other device to determine that the other device supports communication using the port trunk;

negotiating by the adapter port with the port of the other device for configuring the port of the other device for using the port trunk for sending and receiving information to and from the adapter port using the network protocol;

storing at the adapter negotiated port trunk configuration information with a number of network links of the port trunk and port identification information for the adapter port and the port of the other device;

retrieving a write request from the computing device by the adapter via a DMA operation using the PCI-Express link to write data for an exchange at a storage location accessible via the other device using the network protocol;

selecting a link by the adapter from the plurality of network links of the port trunk for transmitting data for the write request;

transferring data in response to the write request by the adapter port on the selected link from among the plurality of network links for a write operation belonging to a same sequence of the exchange for writing the data at the storage location; wherein the selected link is used by the adapter to track an order in which data for the same sequence is transmitted to the other device; and receiving a confirmation for completing the write operation from the port of the other device after the data is written at the storage location, where the port of the other device also uses a same link from among the plurality of network links for sending information to the adapter port for the same sequence using the network protocol.

2. The method of claim 1, wherein the other device is a fabric switch coupled to the adapter port.

3. The method of claim 1, wherein the other port uses a different link than the link used by the adapter port.

4. The method of claim 1, wherein the same sequence is part of an Exchange for writing the data at the storage location.

5. The method of claim 1, wherein the adapter is a Fibre Channel host bus adapter.

6. The method of claim 1, wherein the adapter is a Fibre Channel over Ethernet adapter.

7. The method of claim 1, wherein the network protocol is Ethernet.

8. A non-transitory, machine readable storage medium storing executable instructions, which when executed by a machine, causes the machine to perform a method, the method comprising:

configuring a port trunk as a PCI-Express function managed by an adapter interfacing with a computing device via a PCI-Express link using direct memory access (DMA) operations, where the port trunk includes a plurality of network links that couple an adapter port to a port of another device via the plurality of network links for sending and receiving information using a network protocol;

enabling the configured port trunk for the adapter by setting a parameter at a storage location at the adapter;

transmitting a message by the adapter port using the network protocol to the port of the other device to determine that the other device supports communication using the port trunk;

negotiating by the adapter port with the port of the other device for configuring the port of the other device for using the port trunk for sending and receiving information to and from the adapter port using the network protocol;

storing at the adapter negotiated port trunk configuration information with a number of network links of the port trunk and port identification information for the adapter port and the port of the other device;

retrieving a write request from the computing device by the adapter via a DMA operation using the PCI-Express link to write data for an exchange at a storage location accessible via the other device using the network protocol;

selecting a link by the adapter from the plurality of network links of the port trunk for transmitting data for the write request;

transferring data in response to the write request by the adapter port on the selected link from among the plurality of network links for a write operation belonging to a same sequence of the exchange for writing the data at the storage location; wherein the selected link is used by the adapter to track an order in which data for the same sequence is transmitted to the other device; and receiving a confirmation for completing the write operation from the port of the other device after the data is written at the storage location, where the port of the other device also uses a same link from among the plurality of network links for sending information to the adapter port for the same sequence using the network protocol.

9. The storage medium of claim 8, wherein the other device is a fabric switch coupled to the adapter port.

10. The storage medium of claim 8, wherein the other port uses a different link than the link used by the adapter port.

11. The storage medium of claim 8, wherein the same sequence is part of an Exchange for writing the data at the storage location.

12. The storage medium of claim 8, wherein the adapter is a Fibre Channel host bus adapter.

13. The storage medium of claim 8, wherein the adapter is a Fibre Channel over Ethernet adapter.

14. The storage medium of claim 8, wherein the network protocol is Ethernet.

15. A system, comprising:

an adapter interfacing with a computing device via a PCI-Express link using direct memory access (DMA) operations, having a port coupled to a port of another device using a plurality of links for sending and receiving information using a network protocol, the plurality of links configured to operate within a port trunk that is managed by the adapter as a PCI-Express function;

wherein the port trunk is enabled by setting a parameter at a storage location at the adapter and the adapter transmits a message via the adapter port using the network protocol to the port of the other device to determine that the other device supports communication using the port trunk;

wherein the adapter port negotiates with the port of the other device for configuring the port of the other device for using the port trunk for sending and receiving information to and from the adapter port using the network protocol;

wherein the adapter stores negotiated port trunk configuration information with a number of network links of the port trunk and port identification information for the adapter port and the port of the other device;

wherein the adapter retrieves a write request from the computing device via a DMA operation using the PCI-Express link to write data for an exchange at a storage location accessible via the other device using the network protocol; selects a link from the plurality of network links of the port trunk for transmitting data for the write request; transfers data in response to the write request on the selected link from among the plurality of network links for a write operation belonging to a same sequence of the exchange for writing the data at the storage location;

wherein the selected link is used by the adapter to track an order in which data for the same sequence is transmitted to the other device; and wherein the adapter receives a confirmation for completing the write operation from the port of the other device after the data is written at the storage location, where the port of the other device also uses a same link from among the plurality of network links for sending information to the adapter port for the same sequence using the network protocol.

16. The system of claim 15, wherein the other device is a fabric switch coupled to the adapter port.

17. The system of claim 15, wherein the other port uses a different link than the link used by the adapter port.

18. The system of claim 15, wherein the same sequence is part of an Exchange for writing the data at the storage location.

19. The system of claim 15, wherein the adapter is a Fibre Channel host bus adapter or a Fibre Channel over Ethernet adapter.

20. The system of claim 15, wherein the network protocol is Ethernet.

* * * * *